(12) United States Patent
Tikov et al.

(10) Patent No.: US 7,505,789 B2
(45) Date of Patent: Mar. 17, 2009

(54) MICROWAVE TRANSPONDER

(75) Inventors: Yuri Tikov, Suwon-si (KR); Jong-hwa Won, Suwon-si (KR); Ja-nam Ku, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 509 days.

(21) Appl. No.: 11/111,992

(22) Filed: Apr. 22, 2005

(65) Prior Publication Data

US 2005/0242960 A1  Nov. 3, 2005

(30) Foreign Application Priority Data

Apr. 22, 2004  (KR) .................. 10-2004-0027977

(51) Int. Cl.
*H04M 1/00* (2006.01)
(52) U.S. Cl. ............... 455/562.1; 455/575.7; 455/83; 455/25; 455/41.2; 343/700 MS; 343/702
(58) Field of Classification Search ............. 455/562.1, 455/575.7, 83, 25, 41.1; 343/700 MS, 702, 343/789, 853
See application file for complete search history.

(56) References Cited

U.S. PATENT DOCUMENTS

| | | | | |
|---|---|---|---|---|
| 5,124,714 A | * | 6/1992 | Harada | ................. 343/713 |
| 6,158,383 A | * | 12/2000 | Watanabe et al. | ..... 118/723 AN |
| 6,473,047 B2 | * | 10/2002 | Terashima et al. | .......... 343/741 |
| 6,809,691 B2 | * | 10/2004 | Yamamoto et al. | ......... 343/702 |
| 7,050,017 B2 | * | 5/2006 | King et al. | ................. 343/873 |
| 7,088,249 B2 | * | 8/2006 | Senba et al. | ............ 340/572.8 |
| 7,215,295 B2 | * | 5/2007 | Egbert | ................. 343/795 |
| 2004/0041262 A1 | | 3/2004 | Okamoto et al. | |
| 2004/0074974 A1 | * | 4/2004 | Senba et al. | ................ 235/492 |
| 2005/0093701 A1 | * | 5/2005 | Hollon | .................... 340/572.8 |
| 2005/0212707 A1 | * | 9/2005 | Egbert et al. | ................ 343/702 |
| 2006/0122007 A1 | * | 6/2006 | Savarese et al. | ............. 473/351 |
| 2006/0267778 A1 | * | 11/2006 | Gengel et al. | ............ 340/572.8 |
| 2007/0132591 A1 | * | 6/2007 | Khatri | .................... 340/572.7 |

FOREIGN PATENT DOCUMENTS

| | | |
|---|---|---|
| EP | 1538560 A2 | 6/2005 |
| KR | 2004-86644 A | 3/2004 |
| KR | 2005-167813 A | 6/2005 |

* cited by examiner

*Primary Examiner*—Minh D Dao
(74) *Attorney, Agent, or Firm*—Sughrue Mion, PLLC

(57) ABSTRACT

A microwave transponder. The microwave transponder includes a conductive plate including an antenna, and a semiconductor chip disposed within a terminal gap located in a vicinity of a center of the conductive plate. A window of a predetermined shape is formed to extend from the terminal gap toward a side of the conductive plate. The perfect impedance matching is fulfilled even when the transponder is bent. Since the return loss of the electromagnetic power is reduced at least in a quarter through the impedance matching, the energy transferred to the transponder is maximized.

7 Claims, 5 Drawing Sheets

(a)

(b)

MICROWAVE TRANSPONDER

CROSS-REFERENCE TO RELATED APPLICATIONS

This application claims the benefit of Korean Patent Application No. 2004-27977, filed on Apr. 22, 2004 in the Korean Intellectual Property Office, the disclosure of which is incorporated herein by reference in its entirety.

BACKGROUND OF THE INVENTION

1. Field of The Invention

The present invention is related generally to a microwave transponder. More specifically, the present invention pertains to a microwave transponder having a circular window structure that fulfills impedance matching in order to transfer maximum energy.

2. Description of The Related Art

A microwave transponder is utilized in various applications. For example, a radio frequency identification (RFID) system, which is one of the various applications, is coming into increasing use in industry.

FIG. 1 is a schematic block diagram of a conventional RFID system. Referring to FIG. 1, the RFID system includes a transponder 10, a reader 20, and a main computer 30. The reader 20 includes a transmitter and a receiver. The reader 20 transmits an interrogation signal to the transponder 10 through an antenna installed in the reader 20 (hereinafter, refer to as a reader antenna), and receives necessary data from the transponder 10. The transponder 10 is classed into an active type including a battery and a passive type supplied power from the reader 20. The active type, which includes an energy source, provides a long communication distance, but is large-sized and inoperative in conditions when it is hard to obtain the power source. The passive type, which derives energy from the reader 20, is compact-sized and free from the power, but provides a shorter communication distance than the active type.

The transponder 10, which is the passive type, gets all the needed energy from the interrogation signal of the reader 20. The transponder 10 responds by sending its data to the reader 20 by backscatter communication using the received energy. The reader 20 wirelessly identifies the transponder 10 by reading the data.

FIG. 2 is a schematic view of a conventional transponder 8 disclosed in the United States Patent Application No. 2003/0063002 A1. Referring to FIG. 2, the transponder 8 includes a thin metal plate 2 forming an antenna, a semiconductor chip 3 mounted within or near a terminal gap 4, and a narrow long slit 5 extended from the terminal gap 4 toward an outer edge of the metal plate 2. The slit 5 mainly matches an impedance of the semiconductor chip 3 with that of the antenna.

Recently, it has been required that a transponder be adhered onto a curved installation such as a cylindrical or spherical surface, or in the vicinity of a corner of an installation. When the transponder is bendable, the antenna on a flexible substrate is adversely affected by various distortions such as bending. The impedance of the semiconductor chip is not significantly affected by the deformation of the transponder while the impedance of the antenna is obviously affected by the deformation of the transponder. Accordingly, the impedances of the antenna and the semiconductor chip mismatch, thus limiting an operating range of the identification. Specifically, if the transponder is constructed to adhere on a curved installation, its operating range is limited so as to depreciate the performance or results in standstill.

Conversely, when a larger operating range is needed, the microwave power radiated by the reader has to be increased. However, the increase of the microwave power is restricted due to safety regulation or other legislation.

SUMMARY OF THE INVENTION

To address the above drawbacks of the conventional arrangement, an exemplary aspect of the present invention is to provide a microwave transponder including a flexible antenna capable of adhering on various curved surface and operating within an improved operating range and with a lower microwave power using impedance matching.

In an exemplary embodiment of the present invention, the microwave transponder includes a conductive plate including an antenna, and a semiconductor chip disposed within a terminal gap located in a vicinity of a center of the conductive plate. A window of a certain shape is formed to extend from the terminal gap toward a side of the conductive plate.

In an exemplary embodiment the conductive plate is formed of a flexible material.

A length of the conductive plate is approximately 45% of an operating wavelength of the microwave in a free space.

A width of the conductive plate is approximately 5% of the length of the conductive plate.

The window matches impedances of the antenna and the semiconductor chip.

The specific shape of the window can be a circular-shape.

The specific shape of the window can also be one of an ellipse-shape, a polygon-shape, and a curvilinear-shape.

The window has a maximal characteristic dimension to optimize an operating range depending on a bending degree of the conductive plate.

The maximal characteristic dimension is a diameter of the window.

BRIEF DESCRIPTION OF THE DRAWING FIGURES

The present invention will become apparent and more readily appreciated from the following description of exemplary embodiments of the present invention, taken in conjunction with the accompanying drawing figures of which:

DETAILED DESCRIPTION OF EXEMPLARY EMBODIMENTS OF THE PRESENT INVENTION

Figure 1:
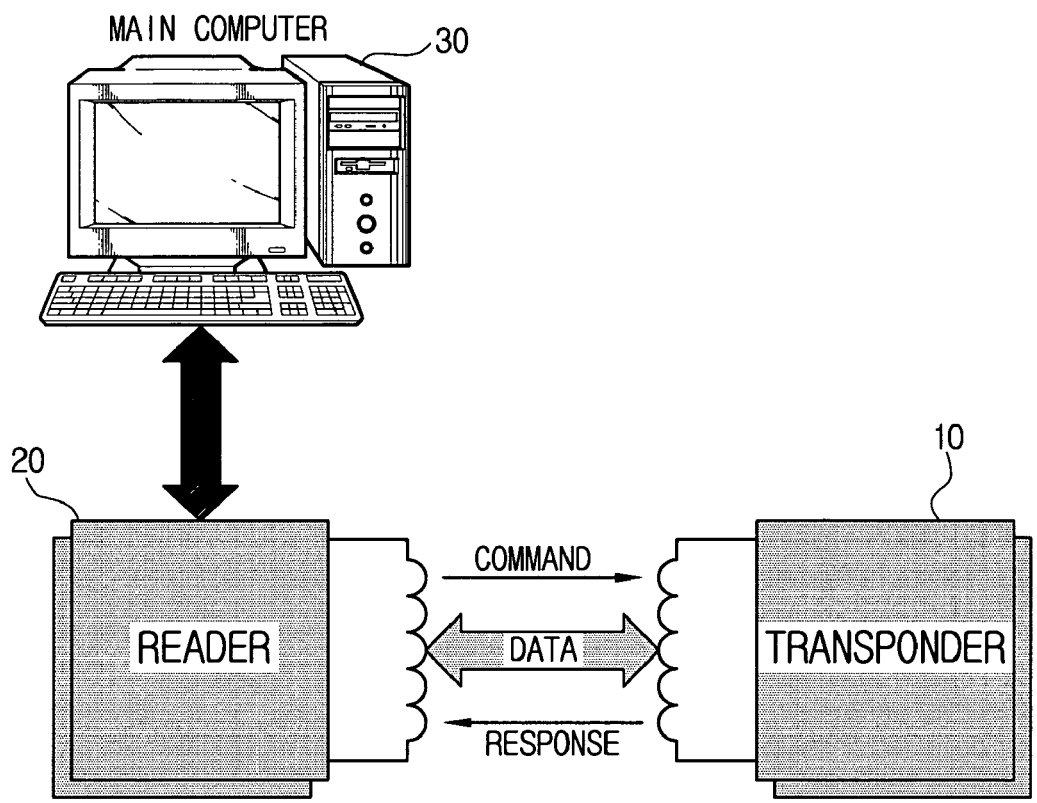
FIG. 1 is a schematic block diagram illustrating a conventional RFID system.

Reference will now be made in detail to exemplary embodiments of the present invention, examples of which are illustrated in the accompanying drawing figures, wherein like reference numerals refer to the like elements throughout. Exemplary embodiments are described below in order to explain the present invention by referring to the drawing figures.

Figure 3:
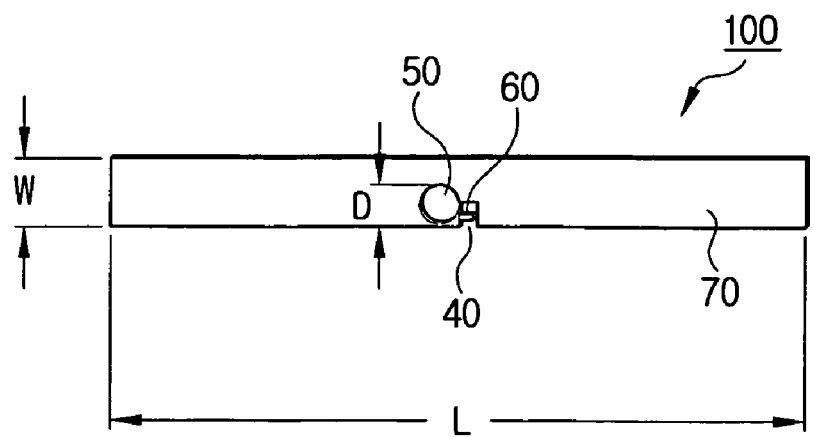
FIG. 3 is a view illustrating a construction of a microwave transponder according to an exemplary embodiment of the present invention.

FIG. 3 is a plan view of a microwave transponder 100 according to an exemplary embodiment of the present invention. Referring to FIG. 3, the microwave transponder 100 includes a conductive plate 70, a semiconductor chip 60, and a window 50. The conductive plate 70 is thin and flexible, and includes a body of an antenna which is not shown. The semiconductor chip 60 is mounted near or within a terminal gap 40 as in the conventional arrangement, and includes a rectifier which is not shown. The terminal gap 40 is located in the vicinity of the center of the conductive plate 70. The window 50 extends from the terminal gap 40 and partly overlaps with the terminal gap 40.

A length L of the conductive plate 70 is approximately 10% shorter than a half-wavelength radiated by a reader 10 (FIG. 1) in a free space. A width W of the conductive plate 70 is approximately 5% of the length L of the conductive plate 70.

In general, impedance matching is necessary to maximize energy transferred from the reader 10 to the semiconductor chip 60 of the microwave transponder 100. For the impedance matching in a given frequency, the actual complex impedance of the semiconductor chip 60 has to be converted to the complex conjugated input impedance of the antenna. The complex impedance of the semiconductor chip 60 has a negative (−) reactance component, that is, capacitive.

Figure 2:
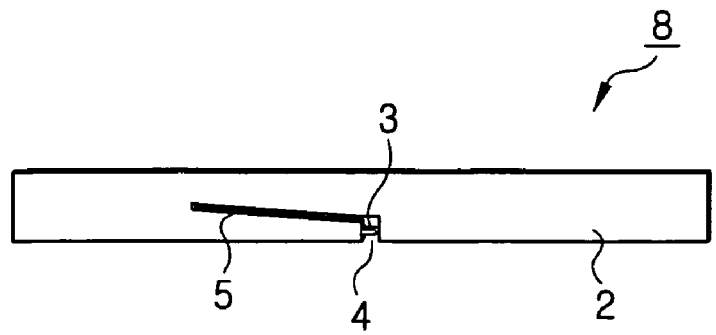
FIG. 2 is a schematic view illustrating a conventional transponder disclosed in the United States Patent Application No. 2003/0063002 A1.

In contrast to the conventional transponder of FIG. 2, the impedance matching according to an exemplary embodiment of the present invention is performed by the window 50 having a substantially circular geometry as shown in FIG. 3.

Figure 4:
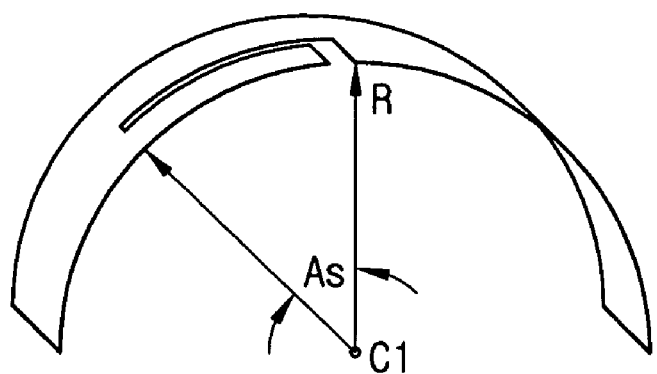
FIGS. 4A and 4B are views illustrating an angle of a slit As and an angle of a circular window Aw measured from a virtual point when the transponders of FIGS. 2 and 3 are bent to a same degree.
Figure 4:
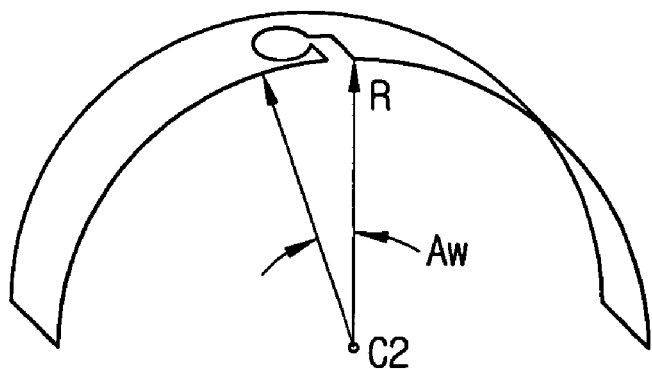

FIGS. 4A and 4B illustrates an angle of a slit As and an angle of a circular window 50 Aw measured from a virtual point when the transponders of FIGS. 2 and 3 are bent to a same degree.

Referring to FIGS. 4A and 4B, the angle Aw of the circular window 50, which is measured from the point C2, is relatively smaller than the angle As of the conventional slit 5. When the microwave transponder 100 is adhered on a curved surface and is bent, the window 50 is constructed to deform less than the slit 5. That is, the circular window 50 of the microwave transponder 100 is not sensitive to the bending as compared with the conventional transponder 8.

The input impedance of the antenna with the circular window 50 depends on a curvature radius R. Since a critical electromagnetic field of the circular window 50 is concentrated in the vicinity of the center of the antenna, that is, close to the semiconductor chip 60, the microwave transponder 100 is less affected by the impedance matching even when adhering on the curved surface.

According to an exemplary embodiment of the present invention, the microwave transponder 100 is provided with an operating bandwidth of more than 4%. The 4% bandwidth is sufficient for a radio frequency identification (RFID) system.

Figure 5:
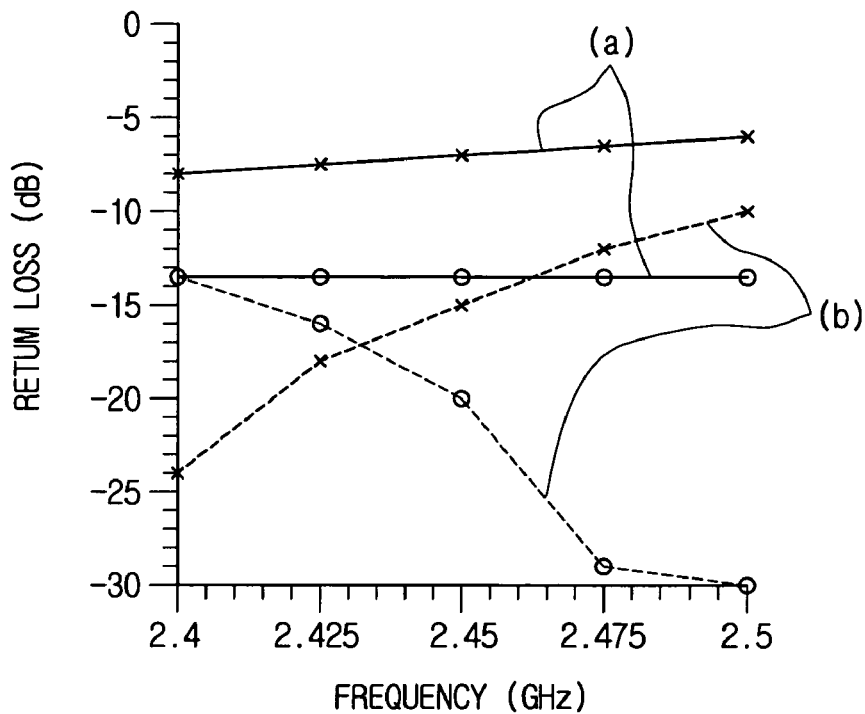
FIG. 5 is a graph illustrating a return loss characteristic when the transponder of FIG. 2 and the microwave transponder according to an exemplary embodiment of the present invention, respectively, are adhered on a planar installation and a semicircular installation.

FIG. 5 illustrates a return loss characteristic when the transponder 8 of FIG. 2 and the microwave transponder 100 according to an exemplary embodiment of the present invention, respectively, are adhered on a planar installation and a semicircular installation. Referring to FIG. 5, —lines indicate the return loss characteristic of the microwave transponder 100 according to an exemplary embodiment of the present invention, and X lines indicate the return loss characteristic of the transponder 8 of FIG. 2. Lines (a) indicate when each transponder is adhered on the planar installation, and lines (b) indicate when each transponder is adhered on the semicircular installation.

When the transponders are adhered on the semicircular installation and bent semicircularly, the return loss of the microwave transponder 100 is by about 6 dB less (in other words, four times less) than that of the transponder 8 (FIG. 2). Accordingly, the microwave transponder 100 is able to operate flawlessly even when a small microwave signal is received from the reader 20 (FIG. 1).

Figure 6:
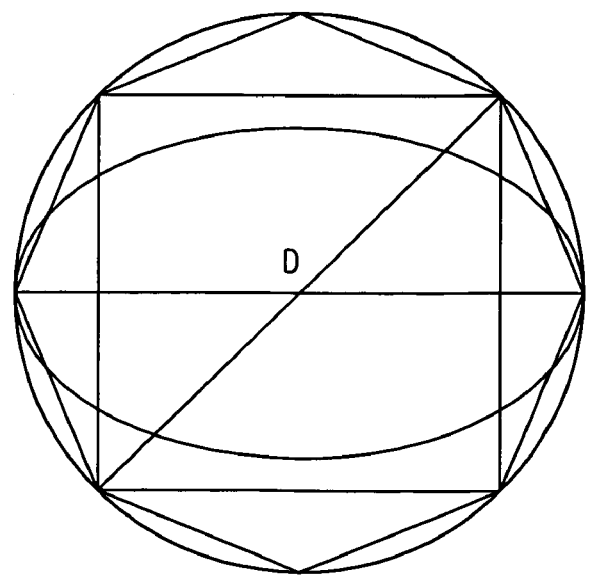
FIG. 6 is a view illustrating exemplary window structures of the microwave transponder according to an exemplary embodiment of the present invention.

FIG. 6 illustrates exemplary window structures of the microwave transponder 100 according to an exemplary embodiment of the present invention. Referring to FIG. 6, the circular window 50 is constructed to be ellipse-shaped, polygon-shaped, or curvilinear-shaped depending on particular technological factors. The circular-shaped window is most suitable for the impedance matching owing to unique property of an ideal circle.

The less area the window 50 occupies, the more the operating range of the RFID at bent installation of the transponder 100. The corresponding characteristic dimension must be increased to reach the same area by variant from the ideal circle window. Hence, the ideal circular shape of the window 50 is most preferable. It should be appreciated that FIG. 6 illustrates examples and that the impedance matching according to an exemplary embodiment of the present invention is applicable to other radio frequencies (RF) and microwave frequencies.

In light of the foregoing, the circular geometry for the impedance matching is significantly less sensitive to the bending of the transponder than the conventional arrangement. Thus, the operating range of the RFID system is less affected by the bending of the transponder.

When the transponder is adhered on the planar installation, if the impedance of the antenna is complex conjugated to that of the semiconductor chip 60, that is, if the antenna and the semiconductor chip 60 are perfectly matched, the decrease of the operating range depending on the bending is mitigated as compared with the conventional arrangement.

When the microwave transponder 100 is adhered on the curved installation such as a semicircular arc, if the antenna and the semiconductor chip 60 are perfectly impedance-matched, the impedance mismatches and the operating range decreases as the microwave transponder 100 is strengthened.

Accordingly, the transponder has to be optimized depending on various forms of the installation to enhance overall performance of the RFID system. An exemplary structural parameter for the optimization is a diameter D of the circular window 50. A degree of the impedance mismatch at the various forms of the installation alters depending on a function of the diameter D.

Figure 7:
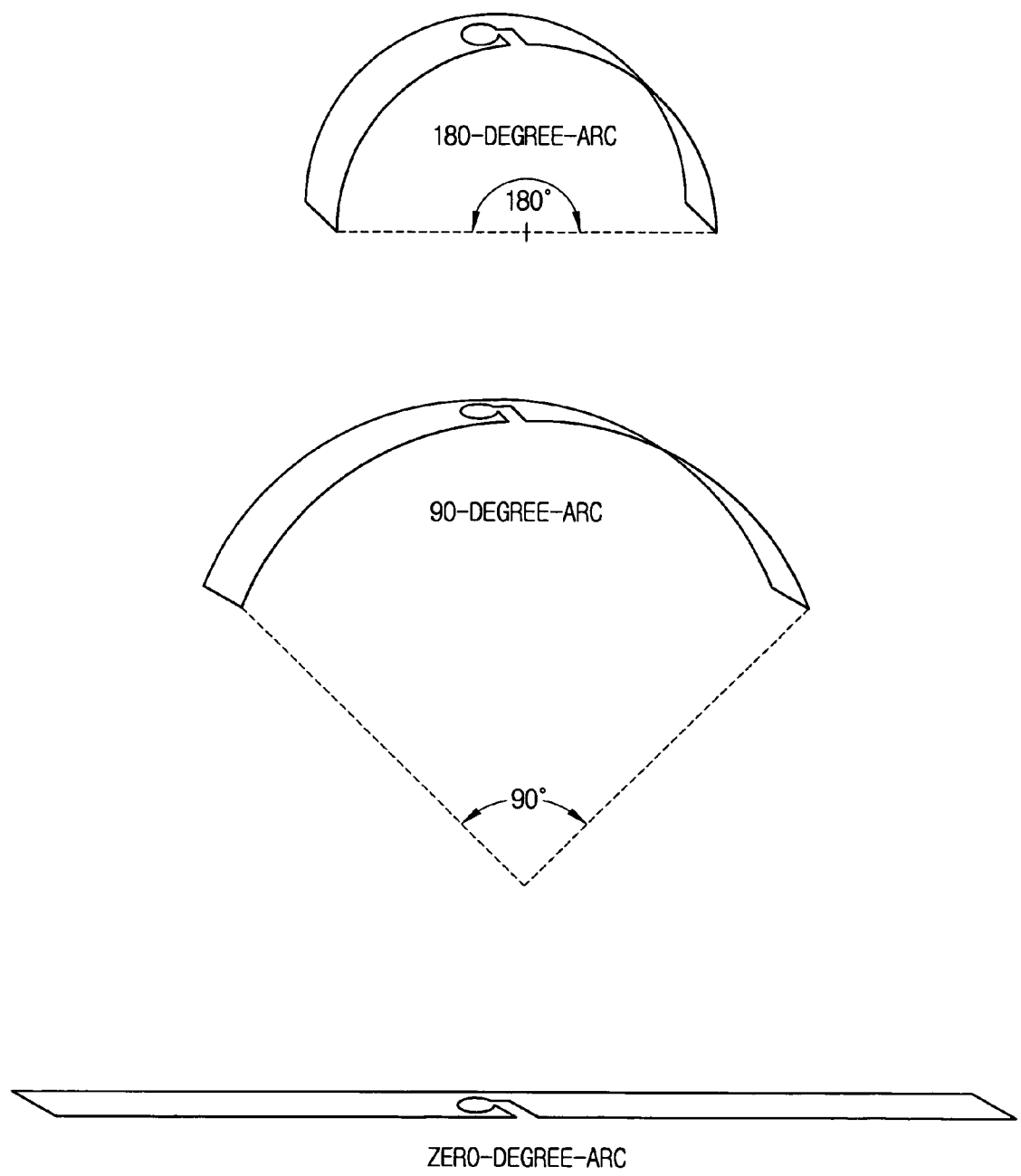
FIG. 7 is a view illustrating various forms of the bent microwave transponder according to exemplary embodiments of the present invention.

FIG. 7 illustrates various forms of the bent microwave transponder 100 according to an exemplary embodiment of the present invention. Referring to FIG. 7, when the microwave transponder 100 is continuously bent between a semicircular form of 180-degree-arc and a planar form of zero-degree-arc, a starting value optimized by a computer is the diameter D of the window of 90-degree arc antenna, which perfectly matches the impedance.

Even if the microwave transponder 100 is bent and deformed to various forms, using the optimized diameter of the window results in good impedance matching.

According to an exemplary embodiment of the present invention, the perfect impedance matching is fulfilled even when the transponder is bent.

Since the loss of the electromagnetic power is reduced to at least a quarter through the impedance matching, the energy transferred to the transponder is maximized.

While exemplary embodiments of the present invention have been described, additional variations and modifications of the exemplary embodiments may occur to those skilled in the art once they learn of the basic inventive concepts. Therefore, it is intended that the appended claims shall be construed to include both the above exemplary embodiments and all such variations and modifications that fall within the spirit and scope of the invention.

What is claimed is:

1. A microwave transponder comprising:
   a conductive plate including an antenna;
   a semiconductor chip disposed within a terminal gap substantially located in a center of the conductive plate; and
   a window of a predetermined shape formed to extend from the terminal gap toward a side of the conductive plates, where the predetermined shape of the window is a circular-shape, and
   wherein the window has a characteristic dimension to optimize an operating range depending on a bending degree of the conductive plate.

2. The microwave transponder of claim 1, wherein the conductive plate is formed of a flexible material.

3. The microwave transponder of claim 1, wherein a length of the conductive plate is approximately 45% of an operating wavelength of a microwave in a free space.

4. The microwave transponder of claim 3, wherein a width of the conductive plate is approximately 5% of the length of the conductive plate.

5. The microwave transponder of claim 1, wherein the window matches impedances of the antenna and the semiconductor chip.

6. The microwave transponder of claim 1, wherein the predetermined shape of the window is one of an ellipse-shape, a polygon-shape, and a curvilinear-shape.

7. The microwave transponder of claim 1, wherein the characteristic dimension is a diameter of the window.

* * * * *